United States Patent Office 3,642,730
Patented Feb. 15, 1972

3,642,730
COPOLYMERS OF OLEFINE AND N-UNSATU-
RATED DERIVATIVES OF CARBAZOLE
Yves Amiard, Jean-Paul Bellissent, and Gilbert Marie,
Pau, France, assignors to Societe Nationale des Petroles
d'Aquitaine, Courbevoie, France
No Drawing. Filed Sept. 26, 1969, Ser. No. 861,446
Claims priority, application France, Sept. 29, 1969,
168,369
Int. Cl. C08f 17/00
U.S. Cl. 260—80.72
18 Claims

ABSTRACT OF THE DISCLOSURE

A process for the preparation of amorphous copolymers of olefins with N-unsaturated carbazole derivatives consists in copolymerising in the presence of a coordination catalyst, at least two olefins, particularly ethylene and propylene, together with one or more N-unsaturated carbazole derivatives, in particular one or more N-alkenyl carbazole derivatives. New amorphous copolymers are obtained by this process, in particular new ethylene-propylene-N-vinyl carbazole terpolymers.

The present invention relates to vulcanisable amorphous copolymers of olefins with N-unsaturated carbazole derivatives; it is also concerned with a process for the production of such copolymers, as well as the vulcanisation thereof, and the vulcanised elastomers which are obtained.

The copolymers provided by the invention are copolymers of at least two alpha-olefins with one or more N-unsaturated carbazole derivatives and more especially copolymers of ethylene, an alpha-olefin comprising at least 3 carbon atoms in its molecule, and one or more N-alkenyl carbazole compounds.

The olefins which enter into the composition of the copolymers according to the invention can have a variable number of carbon atoms, which is generally between 2 and 10; these are more especially ethylene and the alpha-olefins having 3 to 10 carbon atoms, particularly propylene butenes, hexenes and octenes, the most usual being ethylene, propylene and but-1-ene.

The N-unsaturated carbazole compounds which, in accordance with the process of the invention, can be copolymerised with olefins, can be represented by the formula:

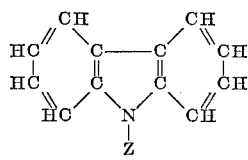

in which Z represents an unsaturated hydrocarbon radical having from 2 to 16 carbon atoms.

Among the most usual carbazole compounds which can be copolymerised by the process according to the invention are those in which the unsaturated radical attached to the nitrogen atom is a linear or branched alkenyl radical. By way of example, mention may be made of N-vinyl carbazole, N-allyl carbazole, N-butenyl carbazole, N-hexenyl carbazole and N-(methyl-1'-ethenyl)-carbazole.

The invention is principally concerned with amorphous copolymers of high molecular weight. These products are capable of being vulcanised solely with the aid of free radical generators.

After vulcanisation, the new copolymers make it possible to provide products having excellent mechanical characteristics, particularly tensile strengths higher than 150 kg./cm.$^2$ and elongations at break which may be, for example, between 200 and 500%.

By appropriate choice of the N-unsaturated carbazole derivatives and the polymerisation conditions, it is possible to vary the mechanical characteristics of the resulting elastomers at will.

The copolymerisation process according to the invention consists in introducing ethylene and one or more alpha-olefins into an organic liquid medium containing at least one N-unsaturated carbazole derivatives, and a coordination catalyst system, and in maintaining the whole in contact until there is formation of copolymers of olefins with the said carbazole derivative or derivatives.

The coordination catalyst systems which can be used in the process according to the invention comprise an organometallic compound, which may or may not be halogenated, or a hydride of one or more metals of Groups I to III of the Periodic Table, and a compound of a transition metal of Groups IV to VIII of the Periodic Table.

Particularly suitable for use in carrying out the process according to the invention are catalyst systems containing organo-aluminium compounds, which may or may not be halogenated, and vanadium compounds, such as vanadium halides and oxyhalides and compounds in which at least one valency of the vanadium is saturated by a hetero atom, particularly oxygen or nitrogen, bonded to an organic group (such as triacetyl acetonate for example).

Excellent results are obtained with catalyst systems which comprise for example vanadium tetrachloride or vanadium oxychloride, VOCl$_3$, and diethyl aluminium chloride or ethyl aluminium sesquichloride.

The catalyst system can further contain a certain proportion of an activator, and particularly a dichloroaryl phosphine, such as dichlorophenyl phosphine for example, a halosulphinyl or halosulphonylthiophene, such as 2-chlorosulphonyl thiophene or 2,4-di-(chlorosulphonyl)thiophene for example, an alkoxy alkyl halosulphite or halosulphate, such as ethoxyethyl chlorosulphate or chlorosulphite for example, or a halogenated derivative of 5,8-dioxo-Δ-1,4-methylene hexahydronaphthalene, such as 1,2,3,4,9,9-hexachloro-5,8-dioxo-Δ-1,4-methylene hexahydronaphthalene, for example.

In order to form the catalyst system, the compounds (A) of the metals of Groups I to III of the Periodic Table may be mixed with the compounds (B) of the transition metals of Groups IV to VIII before they are introduced into the reactor, or not. If they are mixed before introduction, the catalyst is thus preformed and can then be introduced into the mixture to be polymerised continuously or intermittently.

The activator, if it is present, can be mixed with the catalyst before being introduced into the reaction mixture; it is also possible to introduce the activator directly into the mixture during polymerisation, continuously or in fractions; another procedure consists in first of all mixing the activator with the transition metal compound or compounds.

The catalyst system contains such quantities of compounds A and B that the ratio between the metal of compound A and the transition metal of compound B is between 1:1 and 30:1 and preferably between 2:1 and 10:1.

The quantity of activator which may be present can vary within wide limits. In particular it is possible to use 0.5 to 25 moles of activator per atom of transition metal; on the other hand it is necessary for the reaction medium to contain more of compound A, expressed in terms of the atomic equivalent of metal, than of activator.

The copolymerisation is effected in an appropriate solvent, which preferably consists of an aliphatic, aromatic or cycloalkane hydrocarbon, for example, n-heptane, cyclohexane, benzene or mixtures of such solvents. It is also possible to use halogenated hydrocarbons which are neutral as regards the catalyst, for example, chloroform, chlorobenzene or tetrachloroethylene for example. The olefins themselves can serve as the solvent; thus the copolymerisation can be effected in, for example, liquid butene and/or propylene.

The copolymerisation can be carried out at temperatures which are from −50 to +90° C., but it is preferable to effect the said copolymerisation at temperatures which are between, for example, −10 and +30° C.

The pressures usually employed vary from 1 to 10 atmospheres, but it is possible to work under higher pressures.

The proportion of N-unsaturated carbazole derivatives which is added to the olefins is chosen so that the final copolymer contains from 0.1 to 20% by weight of groups which derive from the said carbazole compounds.

The carbazole compound or compounds which are added in carrying out the process according to the invention, are generally all introduced into the reaction vessel before the addition of the catalyst system. Nevertheless, it is possible to introduce all or part of the said compounds during the progress of the polymerisation, continuously or intermittently.

The process according to the invention can be carried out continuously and, in order to achieve this, the solvent, the monomers and the catalyst system are introduced continuously into a polymerisation zone, in quantities such that their residence time in the said zone is sufficient to obtain the desired concentration of copolymers in the reaction mixture.

In the application of the invention to the preparation of ethylene-propylene-N-alkenyl carbazole copolymers, the lower limit of the ethylene content is not a determining factor, but the upper limit should preferably be 75% by weight, so as to avoid crystallinity of the kind which occurs with, polyethylene. As regards the content of alpha-olefins in the amorphous copolymers, this can vary from 5 to 75% by weight. The content of N-alkenyl carbazole of the copolymer can vary between 0.1 and 20% by weight, and it will preferably be between 1 and 15% by weight.

In carrying the copolymerisation into effect, the reaction medium is deprived of free oxygen by passing through it an inert gas, such as introgen or argon for example, before the polymerisation.

The copolymerisation period varies generally with the operating conditions and it is usually between 30 minutes and 3 hours.

At the end of the operation, the catalyst is destroyed and the copolymer is separated from the solvent by coagulation, by means of an alcohol, by steam distillation of the solvent, or by any other method which permits a polymer to be isolated from solutions containing it.

The following non-limitative examples illustrate the invention.

EXAMPLE 1

The copolymerisation is effected in a cylindrical glass reaction vessel with an internal diameter of 10 centimetres and a capacity of 1000 ml., equipped with a stirrer mechanism and tubes for the inlet and outlet of gas. The cylinder is immersed in a bath maintained at 20° C. by means of a thermostat. The gas admission tube reaches the bottom of the cylindrical vesels and ends in a distributor ring with a diameter of 8 centimetres.

700 ml. of anhydrous n-heptane and 25 millimoles of N-vinyl carbazole are introduced into the vessel, which is maintained in a nitrogen atmosphere.

Through the gas inlet tube is introduced a gaseous mixture of propylene and ethylene in a molar ratio of 2:1, the said mixture circulating at the rate of 99 litres (at N.T.P.) per hour.

Two dropping funnels are arranged above the reaction vessel and into the respective funnels are introduced separately and by siphoning under nitrogen pressure, one millimole of vanadium tetrachloride in 30 ml. of anhydrous n-heptane and 6 millimoles of diethyl aluminium monochloride $(C_2H_5)_2AlCl$ in 30 ml. of anhydrous n-heptane.

The gaseous mixture of ethylene and propylene is introduced and continuously evacuated at a rate of flow of 99 litres (at N.T.P.) per hour. The two constituents of the catalyst are introduced separately into the vessel, the introduction being effected dropwise during 15 minutes. After 50 minutes from the commencement of the introduction of the catalyst, the reaction is stopped by adding 20 ml. of isopropyl containing 0.2 g. of "Wing-Stay T" antioxidant. The product formed is purified and coagulated in isopropyl alcohol. After drying this polymer under vacuum, there are obtained 32 g. of a solid product which is amorphous to X-rays and has the appearance of a non-vulcanised elastomer.

The ethylene content in the terpolymer is 47% by weight, its molecular weight is approximately 130,000 and its N-vinyl carbazole content is 7.5% by weight.

Vulcanisation

In a cylinder-type mixer, 100 parts by weight of the copolymer which is obtained are mixed with 60 parts of HAF carbon black, 5 parts of zinc oxide, 0.32 part of sulphur and 6.75 parts of 40% dicumyl peroxide.

The mixture is heated at 160° C. for one hour in a press.

Characteristics of the vulcanised product

Tensile strength—209 kg./cm.$^2$
Elongation at break—360%
Modulus of elasticity at 300% elongation—167 kg./cm.$^2$
Shore A hardness—84
Rebound—37%

EXAMPLE 2

The operating procedure is the same as in Example 1, but only 12.5 millimoles of N-vinyl carbazole are introduced and the reaction only lasts 40 minutes.

After drying under vacuum, 29 g. of a solid product are obtained, the product being amorphous to X-rays and having the appearance of a non-vulcanised elastomer. The ethylene content of the terpolymer is 45% by weight and its N-vinyl carbazole content is 4.8% by weight.

The terpolymer is vulcanised as in Example 1.

Characteristics of the vulcanised product

Tensile strength—204 kg./cm.$^2$
Elongation at break—370%
Modulus of elasticity at 300% elongation—155 kg./cm.$^2$
Shore A hardness—78
Rebound—41%

EXAMPLE 3

The operating procedure is the same as in Example 1, but the reaction takes place at 0° C. and, as constituents of the catalyst system, there are used 0.5 millimole of vanadium oxychloride $VOCl_3$ and 4 millimoles of ethyl aluminium sesquichloride $1/2[Al_2)C_2H_5)_3Cl_3]$.

After the polymer obtained has been dried under vacuum, 32 g. of a solid product are obtained, which is amorphous to X-rays and has the appearance of a non-vulcanised elastomer.

The ethylene content of the terpolymer is 47% by weight, its molecular weight is about 215,000 and its N-vinyl carbazole content is 7.2% by weight.

This terpolymer is then vulcanised as in Example 1.

Characteristics of the vulcanised product

Tensile strength—200 kg./cm.$^2$
Elongation at break—310%
Modulus of elasticity at 300% elongation—190 kg./cm.$^2$
Shore A hardness—85
Rebound—40%

EXAMPLE 4

Example 3 is repeated, but using only 12.5 millimoles of N-vinyl carbazole and stopping the reaction after 40 minutes.

After drying the product obtained under vacuum, 30.5 g. of a terpolymer are obtained, which has an ethylene content of 45% by weight and a vinyl carbazole content of 4.75% by weight, which terpolymer is then vulcanised as in Example 1.

Characteristics of the vulcanised product

Tensile strength—208 kg./cm.$^2$
Elongation at break—340%
Modulus of elasticity at 300% elongation—176 kg./cm.$^2$
Shore A hardness—80
Rebound—44%

EXAMPLE 5

The operating procedure is the same as in Example 1 but using, as constituents of the catalyst system, one millimole of vanadium tetrachloride and 3 millimoles of n-trihexyl aluminium (n-C$_6$H$_{13}$)$_3$Al, and the reaction period is limited to 40 minutes.

After drying the product obtained under vacuum, there are obtained 13 g. of a terpolymer of a high molecular weight of 800,000, having an N-vinyl carbazole content of 10.2% by weight.

EXAMPLE 6

The operating procedure of Example 1 is repeated, but replacing the propylene by but-1-ene, and using a catalyst system which comprises 1 millimole of vanadium oxytrichloride (VOCl$_3$) and 7.5 millimoles of diethyl aluminium monochloride, the two components of the catalyst being separately introduced dropwise in one hour.

20 minutes after completing the injection of the catalyst, the reaction is stopped by adding 50 ml. of isopropyl alcohol. Stirring takes place for 30 minutes and the copolymer is coagulated with 500 ml. of isopropyl alcohol.

7 g. of a mixture of polymers is obtained, and this is subjected to a fractionation in normal heptane under heat.

The soluble portion, representing 5.5 g., is an ethylene-but-1-ene-N-vinyl carbazole copolymer containing 52% by weight of but-1-ene and 1.8% by weight of N-vinyl carbazole.

The portion insoluble in heptane comprises almost exclusively N-vinylcarbazole homopolymer.

EXAMPLE 7

The operating procedure of Example 1 is repeated, but replacing the N-vinyl carbazole by N-allyl carbazole and continuing the reaction for two hours.

38 g. of an ethylene-propylene-N-allyl carbazole copolymer are obtained, this copolymer comprising 45% by weight of ethylene and 2.4% by weight of N-allyl carbazole.

This copolymer is amorphous to X-rays and its appearance is that of a non-vulcanised elastomer.

EXAMPLE 8

The operating procedure is the same as in Example 6, but the N-vinyl carbazole is replaced by N-allyl carbazole.

9.5 g. of an ethylene-but-1-ene-N-allyl carbazole copolymer are obtained, the copolymer containing 55% by weight of but-1-ene and 1.4% by weight of N-allyl carbazole.

We claim:
1. A process for the preparation of substantially linear amorphous copolymers of olefins with a carbazole derivative of the formula

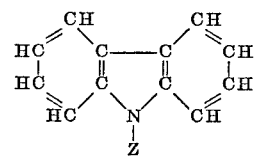

wherein Z represents an unsaturated hydrocarbon radical having from 2 to 16 carbon atoms, which comprises forming a mixture, in an organic liquid medium, of at least two alpha-olefins of the formula R—CH=CH$_2$, in which R represents hydrogen or an alkyl radical having from 1 to 8 carbon atoms, with the aforesaid carbazole derivative and maintaining said mixture at at temperature between —50° C. and +90° C., in contact with a catalyst system consisting of at least one compound selected from the group comprising an organometal compound, a halogenated organometal compound and a hydride of a metal of Groups I, II and III of the Periodic Table and at least one compound of transition metal of Groups IV to VIII inclusive of the Periodic Table, the metals in the aforesaid two groups of metals being present in a motor ratio varying between 1:1 and 30:1.

2. A process according to claim 1, wherein said olefins are selected from the group comprising ethylene, propylene and but-1-ene.

3. A process according to claim 1, wherein said olefins are ethylene and propylene.

4. A process according to claim 1, wherein said olefins are ethylene and but-1-ene.

5. A process according to claim 1, wherein said process is carried out in a solvent for said carbazole derivative.

6. A process according to claim 1 wherein the reaction is conducted in the presence of an inert solvent selected from the group consisting of aliphatic, cycloaliphatic, aromatic or halogenated hydrocarbons.

7. A process according to claim 1, wherein said alkenyl radical has from 2 to 8 carbon atoms.

8. A process according to claim 1, wherein said catalyst system comprises an aluminium alkyl compound and a halide or oxyhalide of vanadium.

9. A process according to claim 6, wherein said aluminium alkyl compound is halogenated.

10. A process according to claim 8 wherein the catalyst system comprises an organoaluminum or halogenated organoaluminum compound.

11. A process according to claim 8 wherein the vanadium compound is selected from the group consisting of vanadium halides and oxyhalides, alkylvanadates, and vanadium-acetylacetonate, said vanadium compound being in conjunction with the reducing trialkylaluminum or alkylaluminum halides.

12. A process according to claim 8 wherein the molar ratio between the aluminum compound and the vanadium compound is from 1:1 to 30:1.

13. A process according to claim 8, wherein said catalyst system includes an activator in an amount ranging from 0.5 to 25 moles per vanadium atom, the said amount being lower than the molar amount of the aluminum compound.

14. A process according to claim 8, wherein said mixture is maintained at a temperature between —10° C. and +30° C.

15. A substantially linear amorphous copolymer comprising units derived from ethylene, from an alpha-olefin having from 3 to 10 carbon atoms and a carbazole derivative of the formula

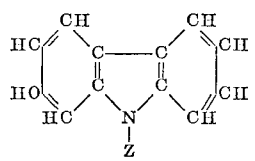

16. A copolymer according to claim 15, wherein said alpha-olefin is selected from the group comprising propylene and but-1-ene, and said carbazole derivative is N-alkenyl carbazole derivative in which the alkenyl radical has from 2 to 8 carbon atoms.

17. A copolymer according to claim 15, wherein said units deriving from said N-alkenyl carbazole derivative are present in a proportion between 1 and 15% by weight.

18. An elastomer comprising one copolymer according to claim 15.

References Cited

UNITED STATES PATENTS 3,248,374    4/1966    Covington _____ 260—785

JOSEPH L. SCHOFER, Primary Examiner

S. M. LEVIN, Assistant Examiner

U.S. Cl. X.R.

260—41 B, C, 79.5 P

UNITED STATES PATENT OFFICE
CERTIFICATE OF CORRECTION

Patent No. 3,642,730            Dated Feb. 15, 1972

Inventor(s) Yves Amiard, Jean-Paul Bellissent, and Gilbert Marie

It is certified that error appears in the above-identified patent and that said Letters Patent are hereby corrected as shown below:

| | |
|---|---|
| Column 3, line 46: | "introgen" to read "nitrogen" |
| Column 3, line 67: | "vesels" to read "vessel" |
| Column 4, line 9: | "evaculated" to read "evacuated" |
| Column 4, line 15: | insert "alcohol" after "isopropyl" |
| Column 4, line 61: | "$[Al_2)C_2H_5)_3Cl_3]$" to read "$[Al_2(C_2H_5)_3Cl_3]$" |
| Column 6, line 24: | "at" to read "a" |
| Column 6, line 32: | "motor" to read "molar" |

UNITED STATES PATENT OFFICE
CERTIFICATE OF CORRECTION

Patent No. 3,642,730     Dated Feb. 15, 1972     Page 2

Inventor(s) Yves Amiard, Jean-Paul Bellissent, and Gilbert Marie

It is certified that error appears in the above-identified patent and that said Letters Patent are hereby corrected as shown below:

Column 7, before line 7: insert "wherein Z represents an unsaturated hydrocarbon radical having from 2 to 16 carbon atoms, said units derived from said alpha-olefin being present in a proportion between 5 and 75% by weight, said units derived from said N-alkenyl carbozole derivative being present in a proportion between 0.1 and 20% by weight and said units derived from ethylene being present in a proportion less than 75% by weight."

Signed and sealed this 3rd day of April 1973.

(SEAL)
Attest:

EDWARD M. FLETCHER, JR.
Attesting Officer

ROBERT GOTTSCHALK
Commissioner of Patents